United States Patent
Hung et al.

(10) Patent No.: US 9,122,854 B2
(45) Date of Patent: Sep. 1, 2015

(54) TEMPERATURE KEY AND METHOD FOR PROTECTING SECURITY OF COMPUTING DEVICE USING THE TEMPERATURE KEY

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jian-Hung Hung, New Taipei (TW); Xin-Shu Wang, Wuhan (CN); Min Yang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/082,236

(22) Filed: Nov. 18, 2013

(65) Prior Publication Data

US 2014/0150088 A1    May 29, 2014

(30) Foreign Application Priority Data

Nov. 29, 2012    (CN) .......................... 2012 1 0497352

(51) Int. Cl.
| | | |
|---|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/31* | (2013.01) |
| *G06F 21/57* | (2013.01) |

(52) U.S. Cl.
CPC .............. *G06F 21/31* (2013.01); *G06F 21/575* (2013.01)

(58) Field of Classification Search
CPC ......... G06F 21/31; G06F 21/36; G06F 21/45; G06F 21/46; G06F 21/32
USPC .......................................................... 726/18
See application file for complete search history.

(56) References Cited

U.S. PATENT DOCUMENTS

2004/0249641 A1* 12/2004 Kwak ........................... 704/275
2011/0273378 A1* 11/2011 Alameh et al. ................ 345/173

* cited by examiner

*Primary Examiner* — Kambiz Zand
*Assistant Examiner* — Stephen Sanders
(74) *Attorney, Agent, or Firm* — Novak Druce Connolly Bove + Quigg LLP

(57) ABSTRACT

A temperature key includes a temperature sensor, a microprocessor chip, a storage device, a port, a record button and an enter button. When the temperature key is connected to a computing device and the record button is pressed, the temperature sensor is triggered to record a temperature signal input by a user. The microprocessor chip converts the temperature signal into a password, stores the password in the storage device, and sends the password to the computing device to lock the computing device. When the temperature key is connected to the computing device again and the enter button is pressed, the microprocessor chip retrieves the password from the storage device and sends the password to the computing device. The computing device is unlocked in response to determining that the received password matches the password stored in the computing device.

15 Claims, 2 Drawing Sheets

TEMPERATURE KEY AND METHOD FOR PROTECTING SECURITY OF COMPUTING DEVICE USING THE TEMPERATURE KEY

BACKGROUND

1. Technical Field

Embodiments of the present disclosure relate to security protection systems and methods, and more particularly to a temperature key and a method for protecting security of a computing device using the temperature key.

2. Description of Related Art

Passwords are widely used for protecting electronic devices from access of unauthorized users. However, simple passwords are easy to guess or attack, and complex passwords are difficult for authorized users to remember. Therefore, there is room for improvement.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
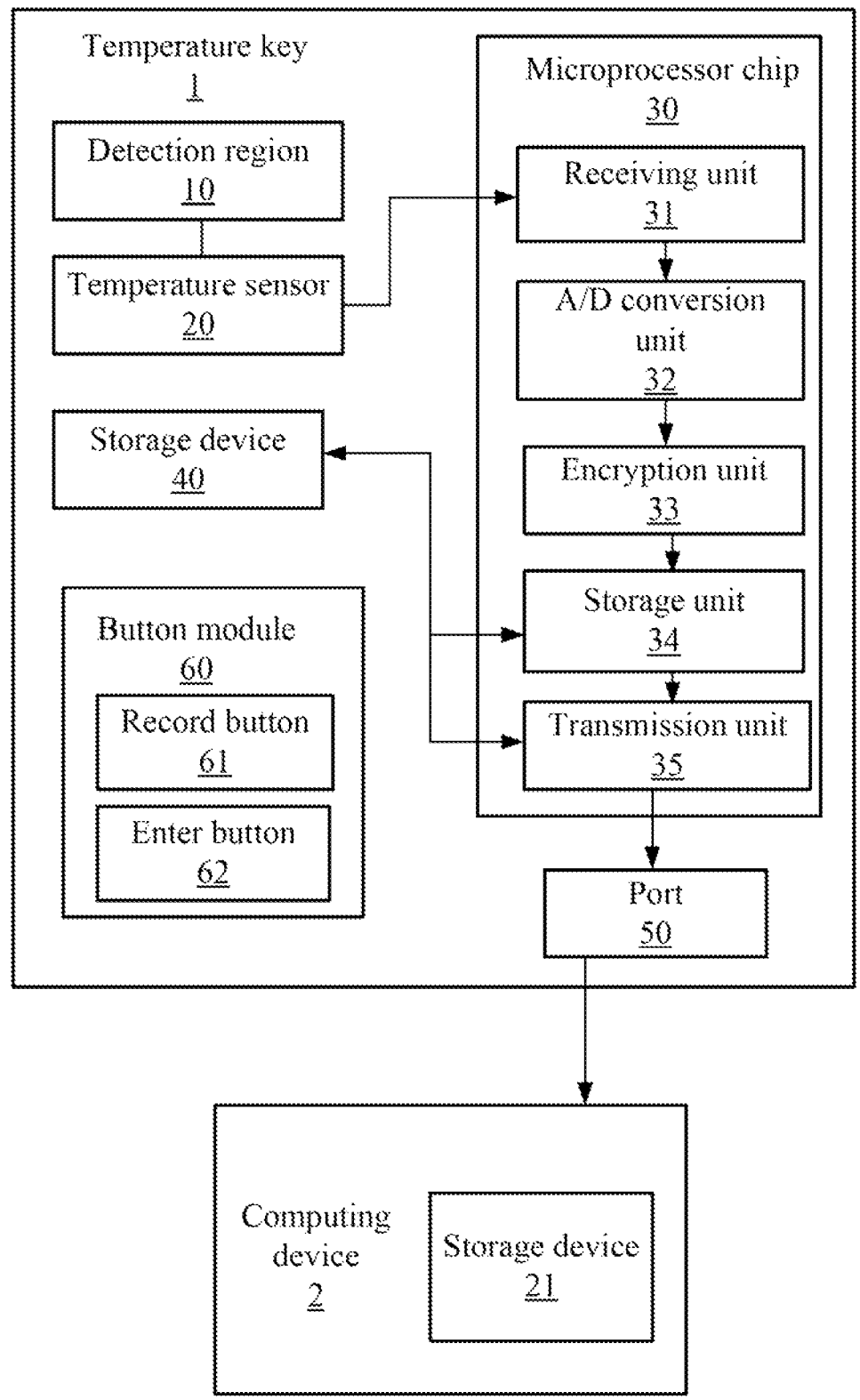
FIG. 1 is a block diagram of one embodiment a computing device comprising function modules of a temperature key.

FIG. 1 is a block diagram of one embodiment of a computing device 2 comprising function modules of a temperature key 1. The temperature key 1 includes a detection region 10, a temperature sensor 20, a microprocessor chip 30, a storage device 40, a port 50, and a button module 60. The microprocessor chip 30 includes a receiving unit 31, an analog/digital (A/D) conversion unit 32, an encryption unit 33, a storage unit 34, and a transmission unit 35. The units 31-35 include computerized code in the form of one or more programs. The button module 60 includes a record button 61 and an enter button 62. In other embodiments, the detection region 10 and the temperature sensor 20 may be integrated as one component.

In one embodiment, the temperature key 1 is a portable electronic device that can connect to the computing device 2 via the port 50. The port 50 may be a serial port or a universal serial bus (USB) port, for example. The computing device 2 may be a computer or other electronic device having data processing capabilities.

A process of locking the computing device 2 by the temperature key 1 is described as follows. When the computing device 2 is powered on, the temperature key 1 is connected to the computing device 2 via the port 50 by a user. In response to receiving a first signal of the record button 61 being pressed by the user, the receiving unit 31 triggers the temperature sensor 20 to record a temperature signal input by the user via the detection region 10 and transmit the temperature signal to the A/D conversion unit 32. For example, the user may touch the detection region 10 to input the temperature signal. The temperature signal input by the user is an analog signal. The A/D conversion unit 32 converts the analog signal into a digital signal, and transmits the digital signal to the encryption unit 33.

The encryption unit 33 processes the digital signal according to a preset rule to generate a password. In one embodiment, the preset rule may be an encryption algorithm, such as DES, 3DES, TDEA, Blowfish, RC5, or IDEA. In other embodiments, the preset rule may be user-defined. For example, the user-defined rule may be set as taking digital values of the digital signal as the password, or taking a portion of the digital values of the digital signal as the password, for example.

The storage unit 34 stores the password in the storage device 40 of the temperature key 1, and the transmission unit 35 transmits the password to the computing device 2. The computing device 2 stores the password into a storage device 21 and locks the computing device 2 by the password. The storage device 40 and the storage device 21 can be dedicated memories, such as EPROMs, hard disk drives (HDDs), or flash memories. After the computing device 2 is locked, the temperature key 1 is disconnected from the computing device 2.

A process of unlocking the computing device 2 by the temperature key 1 is described as follows. At first, in a second instance, the temperature key 1 is connected to the computing device 2 via the port 50. In response to receiving a second signal of the enter button 62 being pressed by the user, the receiving unit 31 triggers the transmission unit 35 to retrieve the password from the storage device 40 and send the password to the computing device 2. The computing device 2 compares the received password with the password stored in the storage device 21 and unlocks the computing device 2 if the received password matches the password stored in the storage device 21, or refuses to unlock the computing device 2 if the received password does not match the password stored in the storage device 21, so that the user cannot boot the computing device 2.

In other embodiments, the button module 60 of the temperature key 1 may be icons displayed on a display device (not shown) of the computing device 2 and are selectable by users. For example, the record button 61 may be replaced by a record icon displayed on the display device of the computing device 2. When the record icon is selected by a user, it indicates that the user intends to generate a password and lock the computing device 2 using the temperature key 1. The enter button 62 may be replaced by an enter icon displayed on the display device of the computing device 2. When the enter icon is selected by the user, it indicates that the user intends to unlock the computing device 2 using the temperature key 1.

Figure 2:
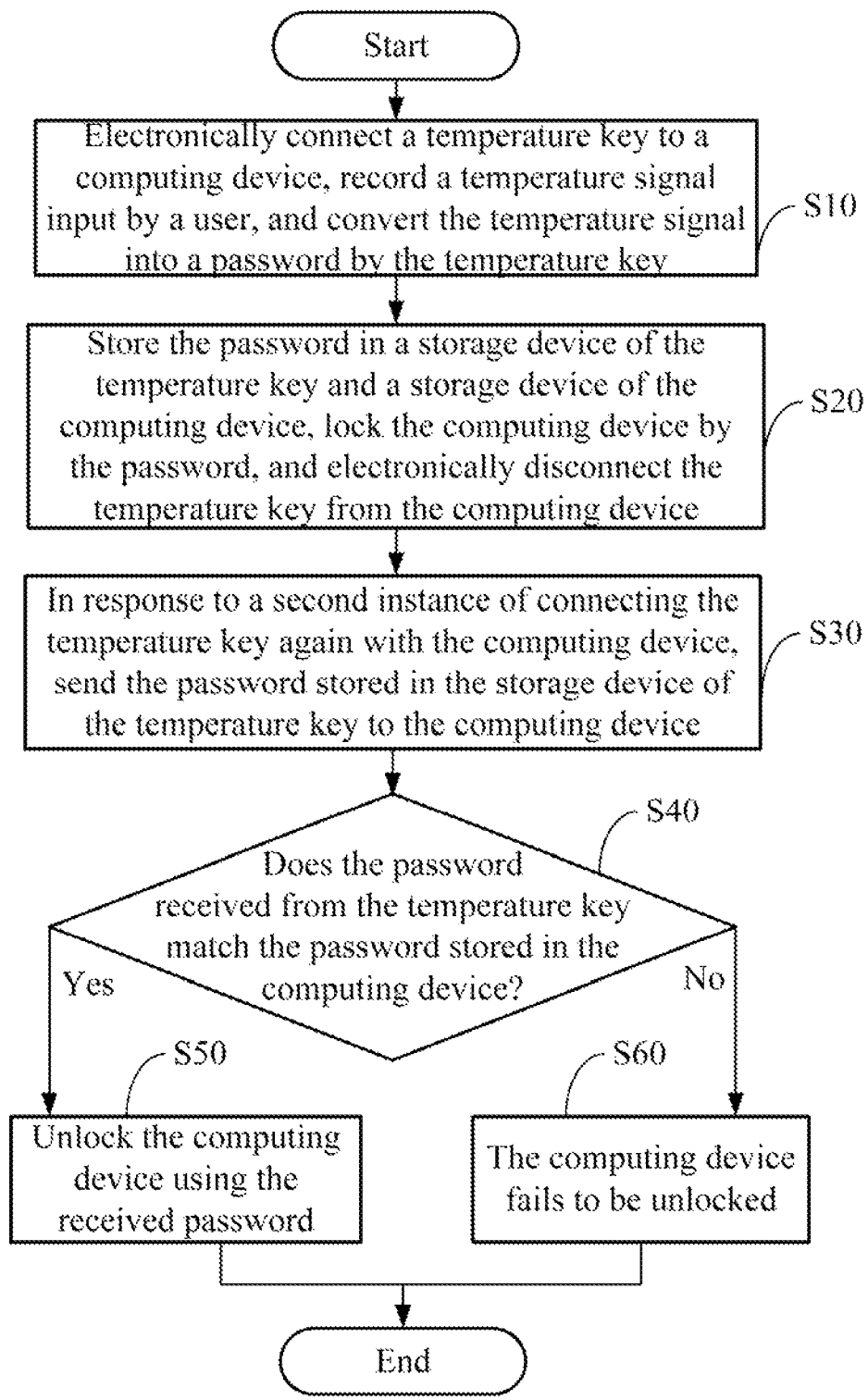
FIG. 2 is one embodiment of a flowchart of a method for protecting security of the computing device using the temperature key of FIG. 1.

FIG. 2 is a block diagram of one embodiment of a method for protecting security of the computing device 2 using the temperature key 1. Depending on the embodiment, additional steps may be added, others removed, and the ordering of the steps may be changed.

In step S10, when the computing device 2 is powered on, the temperature key 1 is connected to the computing device 2 via the port 50 by a user. In response to receiving a first signal of the record button 61 being pressed by the user, the receiving unit 31 triggers the temperature sensor 20 to record a temperature signal input by the user and transmit the temperature signal to the A/D conversion unit 32. The temperature signal input by the user is an analog signal. The A/D conversion unit 32 converts the analog signal into a digital signal, and transmits the digital signal to the encryption unit 33. The encryption unit 33 processes the digital signal to generate a password.

In step S20, the storage unit 34 stores the password in the storage device 40 of the temperature key 1, and the transmission unit 35 transmits the password to the computing device 2. The computing device 2 stores the password into the storage device 21 and locks the computing device 2 with the password. The temperature key 1 is then electrically disconnected from the computing device 2. In another embodiment, the computing device 2 may be locked after the temperature key 1 is electronically disconnected from the computing device 2.

In step S30, when the user intends to unlock the computing device 2, in a second instance, the temperature key 1 is electronically connected to the computing device 2 via the port 50 by the user. In response to receiving a second signal of the enter button 62 being pressed by the user, the receiving unit 31 triggers the transmission unit 35 to retrieve the password from the storage device 40 and send the password to the computing device 2.

In step S40, the computing device 2 determines if the password received from the temperature key 1 matches the password stored in the storage device 21. If the received password matches the password stored in the storage device 21, step S50 is implemented, the computing device 2 is unlocked using the received password. Otherwise, if the received password does not match the password stored in the storage device 21, step S60 is implemented, the computing device 2 fails to be unlocked, so that the user cannot boot the computing device 2.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A temperature key, comprising:
   a port that connects the temperature key to a computing device;
   a storage device; and
   a microprocessor chip that includes one or more programs, when executed by the microprocessor chip, causing the microprocessor chip to perform operations of:
   in response to receiving a first signal of a record button being pressed by a user, triggering a temperature sensor of the temperature key to record a temperature signal input by a user;
   converting the temperature signal into a password and storing the password in the storage device; and
   sending the password to the computing device, locking the computing device by the password, and electronically disconnecting the temperature key from the computing device.

2. The temperature key as claimed in claim 1, wherein the operations further comprise:
   electronically connecting the temperature key to the computing device before the computing device is to be unlocked, receiving a second signal of an enter button being pressed by the user, retrieving the password from the storage device and sending the password to the computing device to unlock the computing device.

3. The temperature key as claimed in claim 2, wherein the record button and the enter button are physical buttons configured on the temperature key.

4. The temperature key as claimed in claim 2, wherein the record button and the enter button are virtual icons displayed on a display device of the computing device and are selectable by the user.

5. The temperature key as claimed in claim 1, wherein the temperature signal is converted into a digital signal, and the digital signal is processed using a preset rule to generate the password.

6. A method for protecting security of a computing device, comprising:
   electronically connecting a temperature key to the computing device;
   in response to receiving a first signal of a record button being pressed by a user, triggering a temperature sensor of the temperature key to record a temperature signal input by a user by a microprocessor chip of the temperature key;
   converting the temperature signal into a password, storing the password into a storage device of the temperature key, and sending the password to the computing device by the microprocessor chip; and
   locking the computing device by the password, and electronically disconnecting the temperature key from the computing device.

7. The method as claimed in claim 6, further comprising:
   electronically connecting the temperature key to the computing device before the computing device is to be unlocked, receiving a second signal of an enter button being pressed by the user, retrieving the password from the storage device and sending the password to the computing device by the microprocessor to unlock the computing device.

8. The method as claimed in claim 7, wherein the record button and the enter button are physical buttons configured on the temperature key.

9. The method as claimed in claim 7, wherein the record button and the enter button are virtual icons displayed on a display device of the computing device and are selectable by the user.

10. The method as claimed in claim 6, wherein the temperature signal is converted into a digital signal, and the digital signal is processed using a preset rule to generate the password.

11. A microprocessor chip of a temperature key having stored thereon instructions that causes the microprocessor chip to perform operations:
    in response to electronically connecting the temperature key to a computing device and receiving a first signal of a record button being pressed by a user, triggering a temperature sensor of the temperature key to record a temperature signal input by a user;
    converting the temperature signal into a password and storing the password into a storage device of the temperature key; and
    sending the password to the computing device, locking the computing device by the password, and electronically disconnecting the temperature key from the computing device.

12. The microprocessor chip as claimed in claim 11, wherein the operations further comprise:
    electronically connecting the temperature key to the computing device before the computing device is to be unlocked, receiving a second signal of an enter button being pressed by the user, retrieving the password from the storage device and sending the password to the computing device to unlock the computing device.

13. The microprocessor chip as claimed in claim 12, wherein the record button and the enter button are physical buttons configured on the temperature key.

14. The microprocessor chip as claimed in claim 12, wherein the record button and the enter button are virtual icons displayed on a display device of the computing device and are selectable by the user.

15. The microprocessor chip as claimed in claim 11, wherein the temperature signal is converted into a digital signal, and the digital signal is processed using a preset rule to generate the password.

* * * * *